US010543614B2

(12) United States Patent
Perez-Romero et al.

(10) Patent No.: US 10,543,614 B2
(45) Date of Patent: Jan. 28, 2020

(54) STRUCTURAL BUTT FINGER JOINT FOR FLAT BOARDS

(71) Applicants: Manuel Perez-Romero, Madrid (ES); Jaime Tarazona-Lizarraga, Madrid (ES)

(72) Inventors: Manuel Perez-Romero, Madrid (ES); Jaime Tarazona-Lizarraga, Madrid (ES)

(*) Notice: Subject to any disclaimer, the term of this patent is extended or adjusted under 35 U.S.C. 154(b) by 203 days.

(21) Appl. No.: 15/537,000

(22) PCT Filed: Dec. 15, 2015

(86) PCT No.: PCT/ES2015/070912
§ 371 (c)(1),
(2) Date: Jun. 27, 2017

(87) PCT Pub. No.: WO2016/097449
PCT Pub. Date: Jun. 23, 2016

(65) Prior Publication Data
US 2018/0229394 A1 Aug. 16, 2018

(30) Foreign Application Priority Data
Dec. 16, 2014 (ES) .................... 201431843

(51) Int. Cl.
*B27F 1/16* (2006.01)
*B27M 3/00* (2006.01)
*F16B 12/04* (2006.01)

(52) U.S. Cl.
CPC ............... *B27F 1/16* (2013.01); *B27M 3/002* (2013.01); *B27M 3/0086* (2013.01); *F16B 12/04* (2013.01); *F16B 2012/043* (2013.01); *Y10T 403/7045* (2015.01)

(58) Field of Classification Search
CPC . B27F 1/00; B27F 1/16; B27M 3/002; B27M 3/0086; F16B 12/04; F16B 2012/043; Y10T 403/47; Y10T 403/472; Y10T 403/7045; Y10T 403/74
USPC ...... 428/33; 403/265, 267, 364, 404; 52/848
See application file for complete search history.

(56) References Cited

U.S. PATENT DOCUMENTS 3,692,340 A * 9/1972 Roth .................... B27F 1/16
403/364
5,313,758 A * 5/1994 Willman ................ E04C 2/292
156/250
2013/0316127 A1* 11/2013 Yako .................... B27F 1/16
428/106

FOREIGN PATENT DOCUMENTS

| AT | 9494 U1 * | 11/2007 | ............... B27F 1/00 |
| CH | 266712 A * | 2/1950 | ............... B27F 1/00 |
| CN | 103372897 A * | 10/2013 | ............... B27C 5/10 |
| FR | 1180575 A * | 6/1959 | ............... B27F 1/00 |
| WO | WO-2013044939 A1 * | 4/2013 | ............... B27D 1/10 |
| WO | WO-2014125358 A1 * | 8/2014 | ............... B27F 1/16 |

* cited by examiner

*Primary Examiner* — Josh Skroupa
(74) *Attorney, Agent, or Firm* — Eugenio J. Torres-Oyola; Victor M. Rodriguez-Reyes; Ferraiuoli LLC

(57) ABSTRACT

A structural joint for attaching two boards by their butts, achieving the correct transmission of forces between them by means of a staggered configuration of the butts thereof to increase the contact surface between both boards, allowing the mutual coupling thereof, both being aligned and coplanar, and at least one of the steps of both boards having a finger profile to further increase the contact surface between both boards.

18 Claims, 3 Drawing Sheets

STRUCTURAL BUTT FINGER JOINT FOR FLAT BOARDS

TECHNICAL FIELD

The present invention relates to the field of structural butt finger joints for flat boards, in which two flat boards are attached by their respective butts, by means of coupling together complementary coupling finger-, saw- or tooth-shaped configurations, and by means of adhesive, obtaining as a result a unitary, projection-free and structurally resistant element formed by the attachment of two flat boards.

PRIOR ART

Structural butt finger joint systems for flat boards are known.

The finger profiles used in finger joints are conventionally generated in boards by means of routers with a rotary butt with the shape of the finger profile, the axis of rotation of the router being parallel to the main face of the board (the face having a larger surface). This solution makes it impossible to generate a finger profile that only covers a portion of the thickness of the board, because the butt of the router is circular and must go through the entire thickness of the board to generate said finger profile. Furthermore, to modify and adapt the finger profile to each board, it is necessary to replace the milling head.

Nevertheless, some solutions are known, such as the solution disclosed in patent document DE841344, showing a board in which half the thickness thereof has been trimmed at an end portion, and where parallel grooves separating a plurality of fingers are made in the half that has not been trimmed. The combination of the grooves and the trimming causes half the extension of said fingers to extend such that they are completely separated from one another. Two complementary boards of this type can be coupled to one another by inserting the fingers of one board into the grooves of the other board. As can be seen, in this embodiment the end of the fingers is curved as is the bottom of the grooves, so there is no contact plane perpendicular to the main faces. This is due to the process of manufacturing by means of a router with an axis parallel to the largest main faces of the boards, and it causes the unwanted effect of causing a more hindered transmission of axial loads as two faces are not perpendicular to said opposing loads. That is because the solution described in this patent document is used to assemble non-structural cladding elements, and therefore the resistance requirements are not taken into account, whereas the need to conceal the joint has prevailed, showing a straight joint on one of its faces, for aesthetic purposes.

Patent documents such as CN201856278, are also known in which boards attached by means of conventional structural finger joints are attached in a staggered manner, the assembling making it possible for the joints to be staggered. This solution does not provide a solution that allows forming a butt joint in two boards with a large contact surface and high structural resistance, because since the superposition of boards is required, the assembly is very thick, and since the attachment planes between boards with staggered joints coincide, the resistance thereof is also negatively affected. Nor does this patent document describe a method that allows producing two independent boards that can be transported separately and attached in situ by means of staggered and finger-shaped coupling configurations.

Structural finger joints are also known in which the fingers are staggered with respect to one another to increase the contact surface, such as those disclosed by means of patent document WO2013044939. This staggering does not produce different finger profiles staggered with respect to one another and spaced by means of tread planes, but rather they are staggered laterally, the increase in contact surface therefore being limited.

Furthermore, there are other patent documents describing different finger joint solutions with improved resistance capacities, such as, for example, those disclosed in patent documents U.S. Pat. No. 692,340 and US2007125448, but they use different operating principles and methods of manufacture.

Patent documents describing methods and machines capable of milling boards by numerical control are also known, such as, for example, by means of patent documents CN103372897 and WO2008142684, but they do not describe their use for obtaining structural joints.

BRIEF DESCRIPTION OF THE INVENTION

The attachment of small-sized elements is often required in construction techniques, due to limitations of manufacture or transport, which elements must be attached for obtaining large-sized elements, such as, for example, construction elements, or furniture parts. This is particularly important is in the case of structural elements, in which continuity of the material is important for the purpose of achieving correct transmission of structural forces and loads to be withstood, preventing weak or easily fractured points. The techniques described above show certain deficiencies as regards the correct transmission of loads. The present invention solves the foregoing and other deficiencies by means of a structural butt finger joint for flat boards, comprising, in a manner that is already known through the prior art documents:
  a first board, with two parallel main faces having a larger surface, two side faces and two butts, with a first finger profile formed by a plurality of fingers in at least one of the butts of said first board;
  a second board, with two parallel main faces having a larger surface, two side faces and two butts, with a second finger profile, complementary to the first finger profile formed by a plurality of fingers in at least one of the butts of said second board;
the first board and second board being coplanar, adjacent and attached by means of coupling and gluing the first finger profile with the second finger profile.

A board is understood to be a rigid element made from a resistant and tenacious material suitable for structural use, and it can be homogenous, aggregate or laminar, such as, for example, wood, laminated wood, plywood, aggregate made from wood shavings, chips or powder or from fibers, resin-, plastic-, metal-based material, or other products having similar features.

Easy-to-cut, lightweight and resistant materials, or other materials, such as wood or plastic derivatives, are preferred, although more resistant materials such as metals are also contemplated. Some of these materials can also be recycled and recyclable, so they are optimal materials for this use.

The structural finger joint of the present invention differs from the known prior art and is characterized in that each of said first and second board has the butt thereof configured by a plurality of staggered steps, each step forming a tread plane parallel to the main faces of the board and a riser perpendicular to said main faces, in that at least one of said risers has a finger profile.

In that sense, the finger profile of each of the boards is made up of a plurality of risers having a finger profile perpendicular to the faces of the board having a larger surface, each with a height of only a fraction of the thickness of the board, and not being aligned but rather staggered, leaving a tread plane perpendicular to the risers exposed between each of said risers.

This configuration allows, when attaching the first and second finger profiles, the contact surface between the two boards to increase, as the surfaces of all the staggered tread planes are added to the surface of the development of the finger profile. This increase in the surface results in a large surface for the glue, and allows distributing structural stresses over a larger surface, thereby reducing isolated stresses, and therefore creating a more resistant joint without increasing the section of the boards.

This embodiment also allows the first and/or the last step to not have a finger profile, such that once the boards are attached, the visible joint will be a straight edge and not a finger profile, thereby better concealing said joint.

According to another embodiment, all the risers of the mentioned staggered steps have a finger profile, which allows maximizing the contact surface between the two boards and assuring a resistant structural joint.

Optionally, the risers having a finger profile have a serrated profile, each finger being defined by two planes converging in an acute angle.

The inclination of said acute angle is optimized to provide optimal structural resistance, distributing the forces to be transmitted between tensile and shear forces to be withstood by the glue or resin attaching both boards to one another. This angle the two faces of each finger form with one another is comprised between 10° and 15°.

The width and the thickness of each finger are adapted and different if the forces expected to be withstood by said finger are compressive and/or flexural compressive and/or tensile and/or flexural tensile forces. The forces that said joint must withstand can thereby be calculated beforehand, and the fingers can be designed such that they optimally withstand said expected forces.

Preferably, the fingers adapted for withstanding tensile and/or flexural tensile forces are wider and longer than the fingers adapted for withstanding compressive and/or flexural compressive forces, because it has been calculated that the resistance of the structural joint is maximized in this way.

In another embodiment, all the fingers form the same angle, regardless of size, because an optimal angle in which the glue attaching two facing fingers works optimally against tensile and shear forces that must be withstood in said angle has been calculated.

The finger profiles used in the finger joints are conventionally generated in boards by means of routers with a rotary head having the shape of the finger profile, the axis of rotation of the router being parallel to the main face of the board. This solution makes it impossible to generate a finger profile that only covers a portion of the thickness of the board, because the head of the router is circular and must go through the entire thickness of the board to generate said finger profile of straight walls. Furthermore, to modify and adapt the finger profile to each board, it is necessary to replace the milling head.

As a result, the proposed structural finger joint has, according to a preferred embodiment, staggered steps and finger profiles obtained by means of a rotary router capable of performing a staggered milling of successive portions of the thickness of the board, generating the tread planes parallel to the main faces of the board and the risers perpendicular to said main faces of the board, following a computer model of the finger profile, by means of the milling tool.

Furthermore, since the shape of the fingers is not conditioned by the shape of the milling head, but rather by the movement said milling head makes following the computer model that can be readily programmed, this solution allows being able to adapt the shape each finger joint to the needs of each board.

Additionally, said staggered steps can be obtained by molding or by the staggered superposition and attachment of a plurality of laminas.

By using the described structural finger joint, a new method can be used for the butt joint in flat boards. This method has the following steps:

obtaining a first board, with two parallel main faces having a larger surface, two side faces and two butts at the ends thereof farthest from one another, with a first finger profile formed in at least one of the butts thereof, configured by a plurality of staggered steps, each step forming a tread plane parallel to the main faces of the board and a riser perpendicular to said main faces, and where at least one of said risers has a finger profile;

obtaining a second board, with two parallel main faces having a larger surface, two side faces and two butts at the ends thereof farthest from one another, with a second finger profile, complementary to the first finger profile, formed in at least one of the butts thereof, configured by a plurality of staggered steps, each step forming a tread plane parallel to the main faces of the board and a riser perpendicular to said main faces, and where at least one of said risers has a finger profile;

transporting the first and second board to the construction and/or assembly site;

attaching the first finger profile to the second finger profile by means of adhesive, glue or resin.

So, first the flat boards provided with the finger profiles serving as coupling configurations are produced, and said boards can be packaged, stored, and/or easily transported to a warehouse, distribution center, shop, or the like, or directly to the final site for the construction, assembly or mounting thereof. Once the boards are at the construction and/or assembly site, the first and second finger profiles, with their corresponding staggered steps, are coupled to one another.

The assembly of the boards in the construction and/or assembly site is possible as a result of the fact that the proposed structural joint solution provides a larger contact surface between the two boards with respect to previously known joints, which allows a larger surface for the glue, adhesive or resin, and this reduces demands on this attachment material, which allows being able to carry out the attachment in a less controlled environment than that of the manufacturing center, such as the construction and/or assembly site.

Additionally, the described method can also include obtaining the first and second finger profiles by means of a milling tool, said milling tool being a programmable machine tool provided with a rotary milling head, and performing the following steps:

a) obtaining a computer model of the finger profile to be formed in each board, being each finger profile formed by a plurality of staggered steps, each step forming a tread plane parallel to the main faces of the board and a riser perpendicular to said main faces, and where at least one of said risers has a finger profile;

b) performing a staggered milling of successive portions of the thickness of the board (1 or 2), generating the tread planes (22, 32) and the risers (23, 33), following the computer model of the finger profile, by means of the milling tool.

Likewise, other techniques allow obtaining the proposed structural joint, for example in the case of using moldable materials, the coupling configuration could be achieved by means of a mold with a counter-shape of the staggered finger profile.

It will be understood that references to geometric positions, such as, for example, parallel, perpendicular, tangent, etc., allow for deviations of up to ±5° with respect to the theoretical position defined by said nomenclature.

Other features of the invention will be seen in the following detailed description of an embodiment.

BRIEF DESCRIPTION OF THE DRAWINGS

The foregoing and other advantages and features will be better understood from the following detailed description of an embodiment in reference to the attached drawings, which must be interpreted in an illustrative and non-limiting manner, in which.

DETAILED DESCRIPTION OF AN EMBODIMENT

Figure 1:
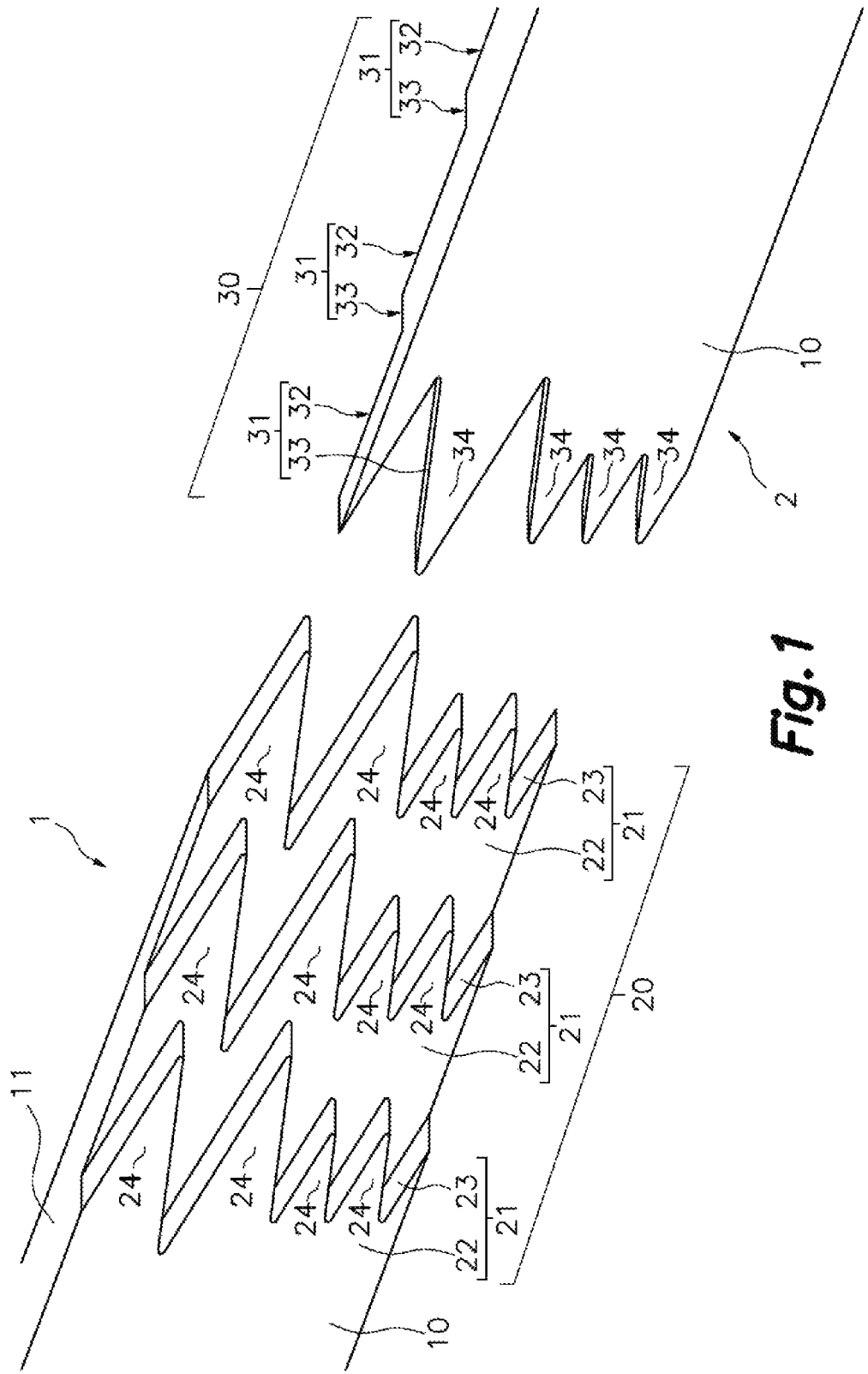
FIG. 1 shows an axonometric view of a first board provided with a finger profile at the butt thereof, configured in three steps and the size of the fingers in the top half being different from those in the bottom half of the mentioned first board, said first board facing and being spaced from a second board provided with a complementary finger profile.
Figure 2:
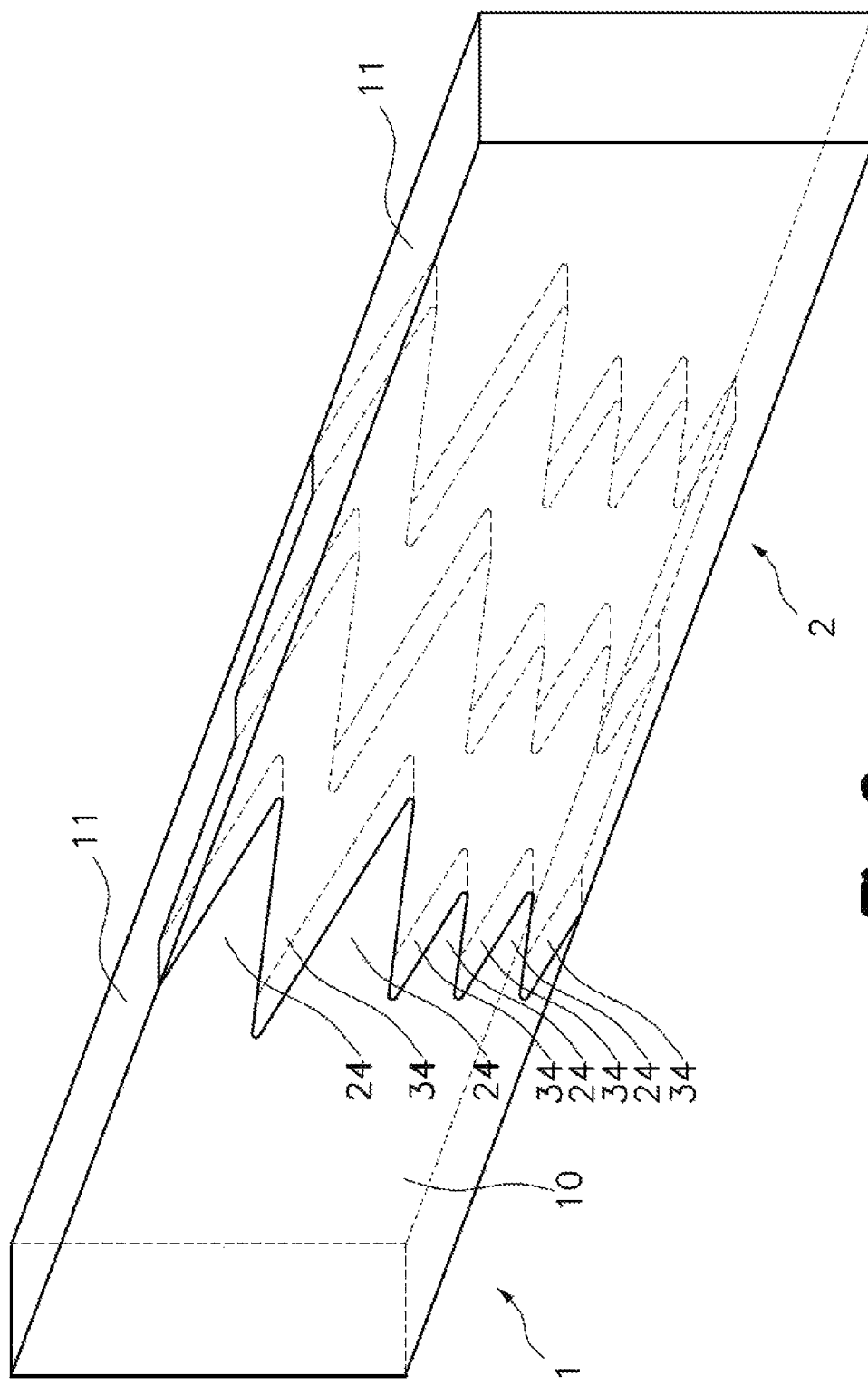
FIG. 2 shows an axonometric view of the first and second boards shown in FIG. 1 coupled to one another, both being aligned and flush, the fingers that are concealed within the structural joint being shown with a discontinuous line.

According to a non-limiting embodiment shown in FIG. 1, the present structural butt finger joint for flat boards consists of first and second flat boards 1 and 2 of wood, said boards 1 and 2 also being able to be made from other products derived from wood, such as laminated panels, conglomerate panels, etc.

It is understood that a flat board 1 or 2 has an approximately parallelepiped shape, having two main faces 10 having a larger surface parallel to one another, two butts of the board 1 or 2 at the ends thereof farthest from one another, and two sides 11 having the same length as the main faces 10 and a smaller surface than same.

The proposed structural joint allows attaching said two boards 1 and 2 at their butts, achieving a resistant joint capable of correctly transmitting compressive, tensile, flexural forces or a combination thereof, from the first board 1 to the second board 2 or vice versa.

To form said structural joint, a series of staggered recesses are made in the area close to the butt of both boards 1 and 2, reducing the thickness of the board in a staggered manner. Each step 21 of the first board 1 forms a tread plane 22 parallel to the main faces 10 of the board, and a riser 23 perpendicular to said main faces 10. Likewise, each step 31 of the second board 2 forms a tread plane 32 parallel to the main faces 10 of the board and a riser 33 perpendicular to said main faces 10.

By recessing said steps 21 and 31 at the butt of both boards 1 and 2 in a complementary manner, the butts of both boards 1 and 2 can be overlapped, both boards 1 and 2 being flush, and having a large contact surface between both boards in the direction parallel to their main faces 10, said contact surface being the sum of all their tread planes 22 or 32.

To also increase the contact surface between both boards 1 and 2 in the direction perpendicular to their main faces 10, it is provided that in the riser planes 23 the first board 1 has a finger profile 20 that is complementary to a finger profile 30 provided in the riser planes 33 of the second board 2, said contact surface in the direction that is perpendicular to that of the main faces 10 thereof being the sum of all the riser planes 23 or 33.

By means of the combination of these two strategies, i.e., staggering and finger profiles, a large contact surface is generated between both boards 1 and 2, on which the adhesive, glue or resins allowing a strong structural joint can be applied. Another advantage of this solution is that the contact surface is either parallel or perpendicular to the main faces 10 of the boards 1 and 2, but not oblique, which would provide less structural resistance.

In the embodiment shown in FIG. 1, a structural joint is shown in which the staggering consists, in the first board 1, of three steps 21, providing two tread planes 22 and three riser planes 23. Likewise, the second board 2 consists of three steps 31, providing two tread planes 32 and three riser planes 33 complementary to those of the first board 1.

In this non-limiting example, the finger profile 20 and 30 consists of a plurality of fingers 24 and 34, each of said fingers 24 and 34 being defined by two planes converging in an acute angle, with a rounded intersection.

The inclination of said acute angle is optimized so as to provide optimal structural resistance, distributing the forces to be transmitted between tensile and shear forces to be withstood by the adhesive, glue or resin. This angle which the two faces of each finger form with one another is approximately 12° in this example, being able to be larger or smaller, depending on the type of adhesive used.

This embodiment corresponds to the structural joint of first and second boards 1 and 2 intended for being used as beams. For this use, the beam will typically have one half subjected to traction and the other half subjected to compression, the half subjected to traction being able to be in the top or bottom half, depending on if the bending moments in that section of the beam are negative or positive.

Figure 3:
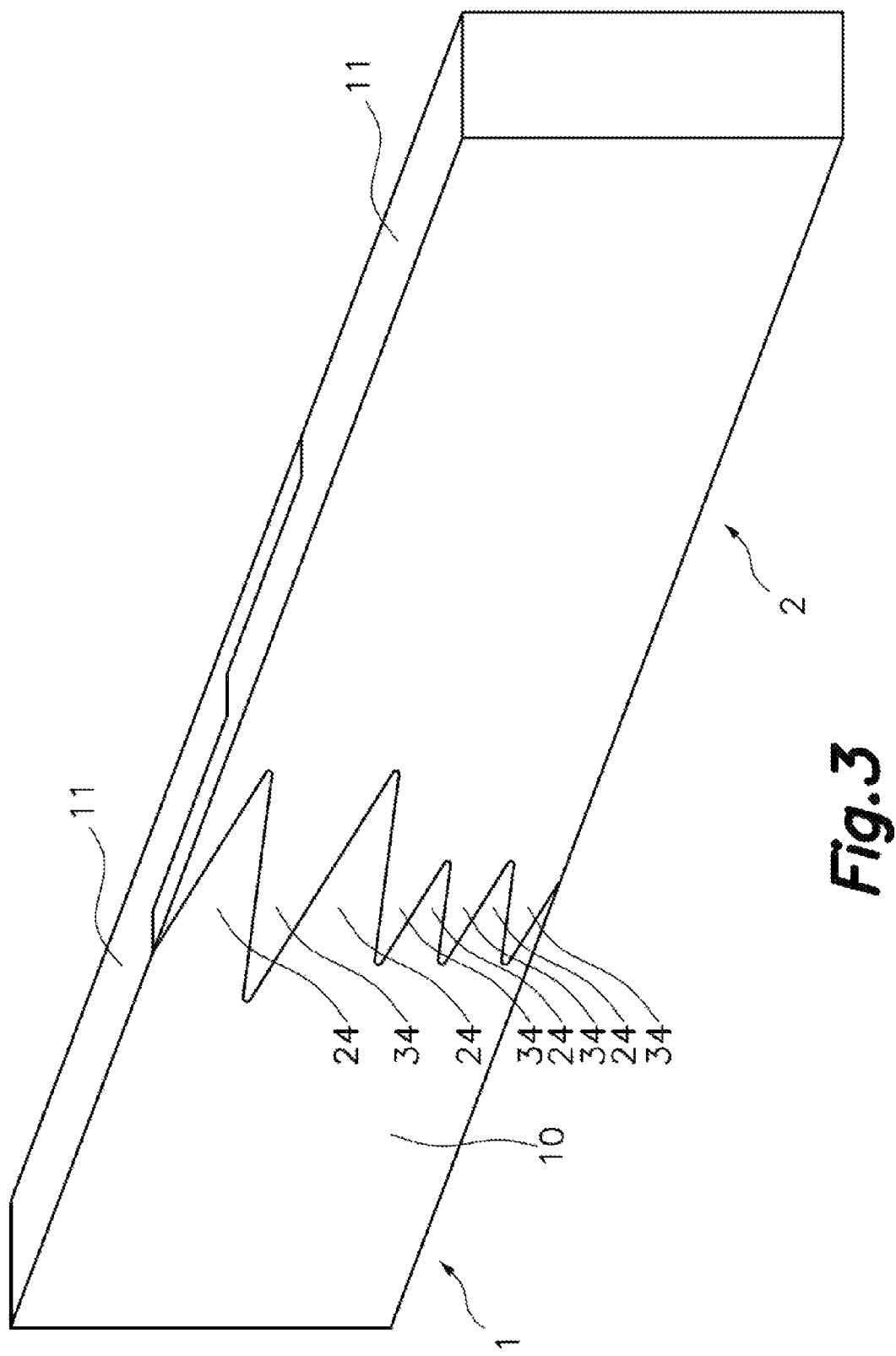
FIG. 3 shows the same view as in FIG. 2 but without the discontinuous lines showing the concealed fingers.

The proposed structural joint shown in the embodiment of FIG. 3 adapts the geometry of the finger profile 20 and 30 to the forces to be withstood provided for the section in which said structural joint is located. To that end, the width and length of each finger are changed, the fingers provided for withstanding tensile forces being smaller than the fingers provided for withstanding compressive forces. As a result, in the example illustrated in FIG. 1 fingers 24 and 34 in the bottom half of the first and second boards 1 and 2 are shown to have a smaller size than the fingers 24 and 34 in the top half of the first and second boards 1 and 2.

In one embodiment in which different forces are not expected in different areas of the joint, all the fingers 24 and 34 will be equal to one another.

In alternative embodiments, the fingers 24, 34 of one step 21, 31 could be different from the fingers 24, 34 of the other steps 21, 31, or one or several of the steps 21, 31 could be lacking fingers 24, 34, the riser plane 23, 33 therefore being completely straight.

Likewise, the height of each step 21, 31 can be changed so that they are not all the same.

The invention claimed is:

1. A structural butt finger joint for flat boards structural attachment, comprising:
a first board, with two parallel main faces having the largest surface of the first board, two side faces and two butts at the ends thereof farthest from one another, with a first finger profile formed by a plurality of fingers in at least one of the butts of said first board, said first finger profile perpendicular to the main faces of the first board;
a second board, with two parallel main faces having the largest surface of the second board, two side faces and two butts at the ends thereof farthest from one another, with a second finger profile, complementary to the first finger profile, formed by a plurality of fingers in at least one of the butts of said second board, said second finger profile perpendicular to the main faces of the second board;
each of said first and second boards has the corresponding first and second finger profile configured by staggered steps, each step forming an exposed tread plane parallel to the corresponding main faces and a riser perpendicular to the corresponding main faces with a finger profile perpendicular to the corresponding main faces;
the first board and the second board are uncoupled and configured to be attached in aligned, coplanar, and adjacent position to each other and where a contact surface is generated between the exposed tread planes of the first and second boards and between the finger profiles of the raisers of the first and second boards, on which an adhesive, glue or resins can be applied.

2. The structural finger joint according to claim 1 wherein the risers having a finger profile have a serrated profile, each finger being partially defined by two planes, perpendicular to the main surfaces, converging in an acute angle.

3. The structural finger joint according to claim 2, wherein the converging planes defining the fingers form the same angle in all the fingers.

4. The structural finger joint according to claim 3, wherein the converging planes defining the fingers form with one another an angle between 10° and 15°.

5. The structural finger joint according to claim 1, wherein the fingers of one half of the first and second boards are wider and longer than the fingers of the other half of the first and second boards.

6. The structural finger joint according to claim 1 wherein the material of the boards is one of the following: wood, laminated wood, plywood, aggregate made from wood shavings, chips or powder or from fibers, resin-, plastic-, metal-based material.

7. The butt finger joint according to claim 1 wherein the first and second finger profiles are molded in a moldable material or are each a single board with successive milled portions of the thickness of said board or are each a plurality of laminae attached in staggered positions.

8. The butt finger joint according to claim 1 wherein the first and second boards are attached by means of coupling and gluing the first finger profile with the second finger profile.

9. A method of construction for the butt joint of flat boards structural attachment by means of structural butt finger joints, comprising:
obtaining a first board, with two parallel main faces having the largest surface of the first board, two side faces and two butts at the ends thereof farthest from one another, with a first finger profile formed in at least one of the butts thereof, said finger profile being perpendicular to the main faces of the first board;
obtaining a second board, with two parallel main faces having the largest surface of the second board, two side faces and two butts at the ends thereof farthest from one another, with a second finger profile, complementary to the first finger profile, formed in at least one of the butts thereof, said finger profile being perpendicular to the main faces of the second board;
each of said first and second boards has been obtained with the corresponding first and second finger profile configured by staggered steps, each step forming an exposed tread plane parallel to the main faces of the board and a riser perpendicular to the corresponding main faces and with a finger profile perpendicular to the corresponding main faces, generating a contact surface between the exposed tread planes of the both first and second boards and between the finger profiles of the raisers of the first and second boards,
and the method including following steps:
transporting the first and second board to a construction site;
aligning the first and second board being flush to each other;
applying adhesive, glue or resins to the contact surfaces and attaching the contact surface of the first finger profile to the contact surface of the second finger profile keeping said alignment.

10. The method according to claim 9, wherein the first and second finger profiles are obtained by means of a milling tool, which is a programmable machine tool provided with a rotary milling head, and which performs the following steps:
obtaining a computer model of the finger profile to be formed in each first and second boards, each finger profile being formed by a plurality of staggered steps, each step forming a tread plane parallel to the main faces of the board and a riser perpendicular to said main faces, and where at least one of said risers has a finger profile;
performing a staggered milling of successive portions of the thickness of the board, generating the tread planes and the risers, following the computer model of the finger profile, by means of the milling tool.

11. The method according to claim 9 or 10, wherein the finger profiles are obtained by means of a milling operation by means of a programmable machine tool provided with a rotary milling head; and in that the staggered steps are obtained by means of an operation consisting of the staggered milling of successive portions of the thickness of the board, or by means of the staggered attachment of a plurality of laminae.

12. The method according to preceding claim 11 wherein the step of attaching the first finger profile to the second finger profile includes gluing together said the first finger profile with the second finger profile by means of adhesive, glue or resin.

13. The method according to preceding claim 10 wherein the step of attaching the first finger profile to the second finger profile includes gluing together said the first finger profile with the second finger profile by means of adhesive, glue or resin.

14. The method according to claim 9, wherein the first and second boards and their corresponding first and second staggered finger profiles are obtained by means of the molding of a moldable material.

15. The method according to preceding claim 14 wherein the step of attaching the first finger profile to the second finger profile includes gluing together said the first finger profile with the second finger profile by means of adhesive, glue or resin.

16. The method according to claim 9, wherein an adhesive product, or a component of an adhesive product, is applied on at least the exposed tread planes and/or the risers, and the adhesive capacity thereof is temporarily inhibited by means of a removable protective material, or by means of the lack of a chemical reagent.

17. The method according to preceding claim 16 wherein the step of attaching the first finger profile to the second finger profile includes gluing together said the first finger profile with the second finger profile by means of adhesive, glue or resin.

18. The method according to preceding claim 9 wherein the step of attaching the first finger profile to the second finger profile includes gluing together said the first finger profile with the second finger profile by means of adhesive, glue or resin.

* * * * *